United States Patent [19]
Bryant

[11] Patent Number: 5,711,456
[45] Date of Patent: Jan. 27, 1998

[54] ABOVE GROUND FUEL TRANSFER MODULE

[76] Inventor: Billy O. Bryant, 6509 Yosemite Pl., Bakersfield, Calif. 93309

[21] Appl. No.: 512,666

[22] Filed: Aug. 8, 1995

[51] Int. Cl.⁶ .................................................. B67D 1/16
[52] U.S. Cl. .................................. 222/108; 222/40
[58] Field of Search ..................... 222/108, 129, 222/608, 40, 66, 183; 137/234.6, 312, 264, 363

[56] References Cited

U.S. PATENT DOCUMENTS

| | | |
|---|---|---|
| 2,944,563 | 7/1960 | De Biasio et al. . |
| 3,366,280 | 1/1968 | Sampson et al. . |
| 4,901,748 | 2/1990 | Shotmeyer .......................... 137/234.6 |
| 4,960,222 | 10/1990 | Field, III . |
| 4,986,446 | 1/1991 | Montgomery et al. . |
| 4,988,020 | 1/1991 | Webb . |
| 5,114,046 | 5/1992 | Bryant . |
| 5,400,924 | 3/1995 | Brodie ................................ 222/108 |

FOREIGN PATENT DOCUMENTS 2209183  1/1991  United Kingdom .

Primary Examiner—Gregory L. Huson
Attorney, Agent, or Firm—Lyon & Lyon LLP

[57] ABSTRACT

An above ground fuel transfer module includes a bottom surrounded by vertical side walls forming a fuel containment vessel. One corner of the support frame has the vertical side walls recessed to form a recessed compartment for a fuel dispensing pump and electrical equipment which are thereby protected by the frame and side walls from being damaged by vehicles or the like operated in the vicinity. An electronic circuit card connected to a control panel controls the transfer of fuel and monitors safety conditions.

9 Claims, 5 Drawing Sheets

ABOVE GROUND FUEL TRANSFER MODULE

BACKGROUND

This invention relates to apparatus for transferring fuel to vehicles or fuel containers.

Fuel burning vehicles such as automobiles, trucks, boats, airplanes and the like require periodic refueling from a large fuel storage tank. Heretofore, it has been conventional to bury such fuel storage tanks under ground and to pump the fuel to the vehicle. However, such underground tanks are subject to deterioration and eventual failure leading to fuel contamination of the surrounding ground and underground water supplies. As a result of environmental concerns, now there are substantial requirements and restrictions for underground fuel storage tanks, significantly increasing the cost thereof. Moreover, an underground fuel storage tank is a very permanent installation which cannot be moved from location to location without considerable difficulty, expense and time.

Thus, it has become increasingly more popular to provide above ground fuel transfer systems that are not subject to the same restrictions and regulations and can be readily moved to new locations as desired. For even greater flexibility and mobility of such above ground fuel transfer systems, they are often provided with the fuel dispensing equipment mounted on the same frame as the fuel tank whereby the entire assembly can be moved. Such fuel systems are usually provided with a containment vessel formed around the tank to receive and contain any fuel that may leak from the tank and the fuel dispensing equipment is mounted externally of the containment vessel. An example of a combined fuel containment and tank system is disclosed in U.S. Pat. No. 5,114,046 issued to Bryant.

However, it has been found that the fuel dispensing equipment, including expensive pumps and gauges, is often damaged by the improper operation of vehicles being refueled and by the equipment used in moving the fuel transfer system. It has also been found that, while above ground fuel storage systems having fixed tanks mounted thereto provide advantages over underground tanks, these above ground systems are not ideal for all applications. The fixed tanks, being of a finite, limited size, frequently may be too small to supply the amount of fuel required in a particular application. Additionally, the size and weight of the tank makes the fuel transfer system more difficult and expensive to transport from one location to another.

Another disadvantage of fixed tank storage and dispensal systems is that the user is forced to transfer fuel from an existing storage system, such as a bladder or tank, to the fixed tank before the fuel can be dispensed. This transfer can be time consuming. For example, to transfer 12,000 gallons of fuel using a 250 gallon per minute pump, it would take 48 minutes to transfer the fuel to the fixed tank before the fuel would be ready to be dispensed. Thus, there existed a need for a more efficient apparatus to transfer fuel.

SUMMARY OF THE INVENTION

The present invention provides a fuel containment vessel formed as part of a support frame for a fuel transfer module, wherein a portion of the support frame used for accommodating fuel dispensing equipment forms a compartment protected from both fuel tank leakage and external damage by vehicles and the like. Additionally, the apparatus contains at least one fuel line, at least one valve, a pump, and a control panel connected to an electronic circuit card that monitors safety conditions and facilitates the transfer of fuel between an external fuel tank or bladder and a receptacle such as a vehicle fuel tank.

Accordingly, it is an object of the present invention to provide an improved above ground fuel transfer module that allows for the safe and efficient transfer of fuel from tanks or bladders, while preventing the module from being damaged by vehicles operating in the vicinity of the module. Other and further features, objects and advantages will appear hereinafter.

BRIEF DESCRIPTION OF THE DRAWINGS

It is to be understood that the accompanying drawings are provided for the purpose of illustration only, and are not intended as a definition of the limits of the invention. The drawings schematically illustrate a preferred embodiment of the present invention, in which.

DETAILED DESCRIPTION OF THE PREFERRED EMBODIMENT

Figure 1:
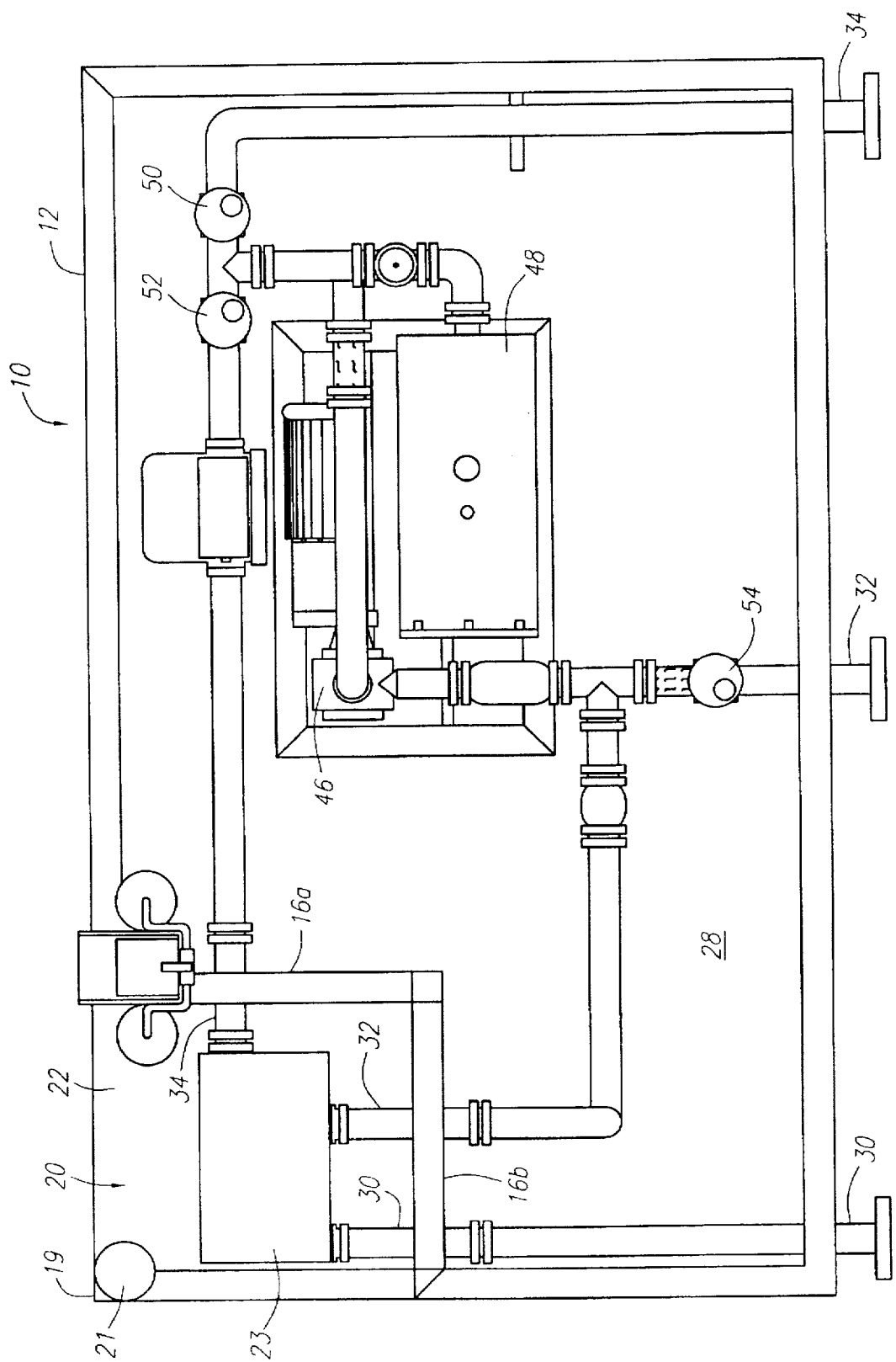
FIG. 1 is a top plan view of a fuel transfer module.

Referring to the FIG. 1, the preferred embodiment of the fuel transfer module of this invention is generally designated 10 and includes a support frame 12 and fuel dispensing equipment, generally designated 13. The support frame 12 is preferably rectangular, as best seen in FIG. 1. However, for specific applications, the support frame may alternatively be shaped square or some other convenient shape having plural sides.

Figure 2:
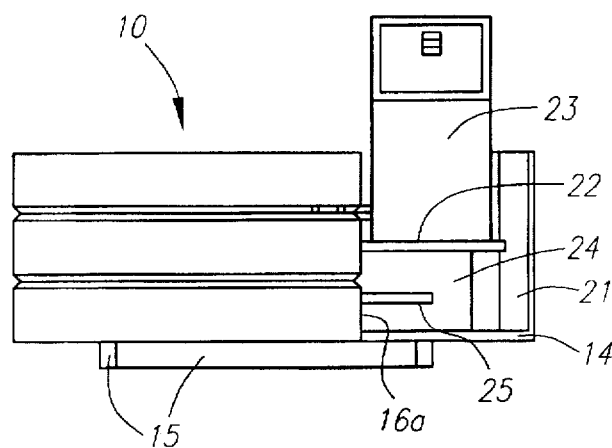
FIG. 2 is an end elevation view of the fuel transfer module of FIG. 1.
Figure 3:
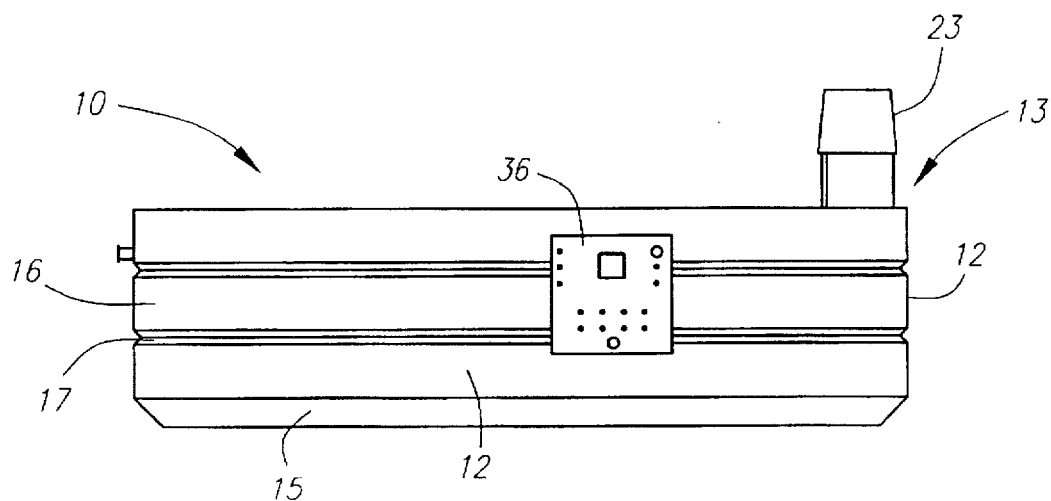
FIG. 3 is a side elevation view of the fuel transfer module of FIG. 1.
Figure 4:
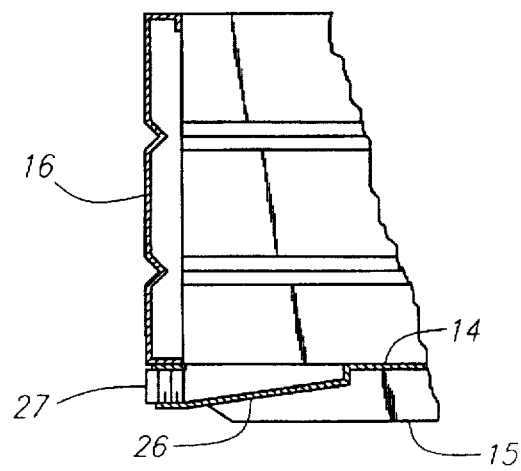
FIG. 4 is an enlarged, fragmentary sectional elevation of the fuel transfer module of FIG. 1.

As shown in FIGS. 2–4, the rectangular support frame 12 has a bottom 14 supported on a plurality of beams 15 adapted to rest on the ground. The rectangular support frame 12 also has fuel-tight vertical side walls 16 that extend around the perimeter of the frame 12. The side walls 16 are also joined to the bottom 14 in a fuel-tight manner. Thus, if fuel being transferred leaks inside the transfer module, the fuel will be contained. The vertical sides 16 may be reinforced, such as by, e.g., ribs 17, to strengthen the support frame 12 and adequately contain any leaked fuel without bulging.

Figure 9:
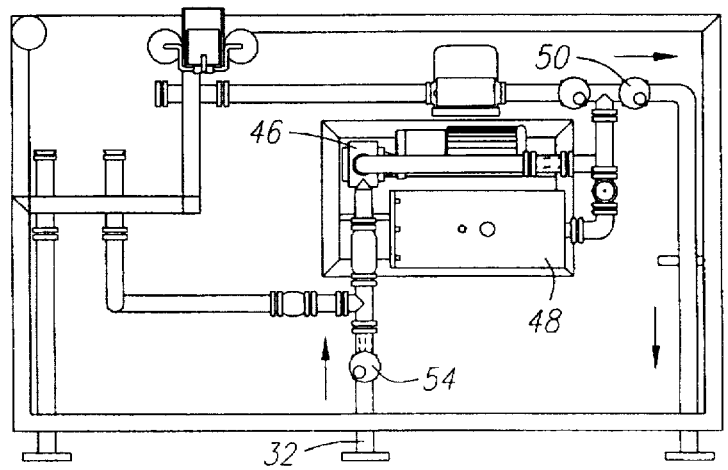
FIG. 9 illustrates the flow of fuel as it is recirculated in the fuel transfer module of FIG. 1.

As shown in FIG. 1, at one corner 19 of the support frame 12, the vertical sides 16a and 16b are recessed from the outer perimeter 12a of the support frame to form a substantially rectangular recessed compartment, generally designated 20. A vertical post 21 is securely mounted to the bottom 14 at the corner 19 and preferably is of extremely sturdy construction to withstand impacts from vehicles operating in the vicinity. A horizontal platform 22 is mounted in the compartment 20 in a spaced relationship above the bottom 14. The fuel dispensing apparatus, e.g., such as a conventional service station type fuel dispenser 23, is mountable on the platform 22. The fuel dispenser 23 may be used to dispense fuel to a receptacle such as a vehicle gas tank (not shown). By this arrangement, the fuel dispenser 23 is positioned within the recessed compartment 20 with nothing extending beyond the horizontal extent of the support frame 12 and, more specifically, beyond the principal vertical side walls 16 and post 21, whereby the equipment is fully protected from vehicles operated in the vicinity and equipment used for moving the fuel transfer module 10. The present fuel transfer module 10 may be provided equipped either with or without a fuel dispenser 23. FIG. 9 illustrates a configuration provided without a fuel dispenser 23.

As shown in FIG. 4, the containment vessel formed by the bottom 14 and sides 16 of the frame 12 respectively, preferably includes a drain box 26 with a drain plug or fitting 27 mounted in the bottom 14 between the beams 15, preferably disposed horizontally within the side walls 16 whereby the drain box 26 and fitting 27 also are fully protected from vehicles operating in the vicinity.

When the fuel storage and dispensing apparatus 10 is to be used in a facility for refueling vehicles that does not require the detailed consumer information or user convenience of a standard fuel dispenser 23, such as a fuel storage and dispensing apparatus at an airport for refueling airplanes, the fuel dispenser 23 may be replaced with a simple hose extending from a pump located within the recessed compartment 20. Further, while the illustrated preferred embodiment of this invention has the recessed compartment 20 located at a corner of the support frame 12, it will be readily apparent to those skilled in the art that the recessed compartment 20 may also be located elsewhere along the sides of the frame, such as in the middle of one end of the frame, whereby the equipment located in the compartment will still be protected from vehicles operating in the vicinity.

Figure 5:
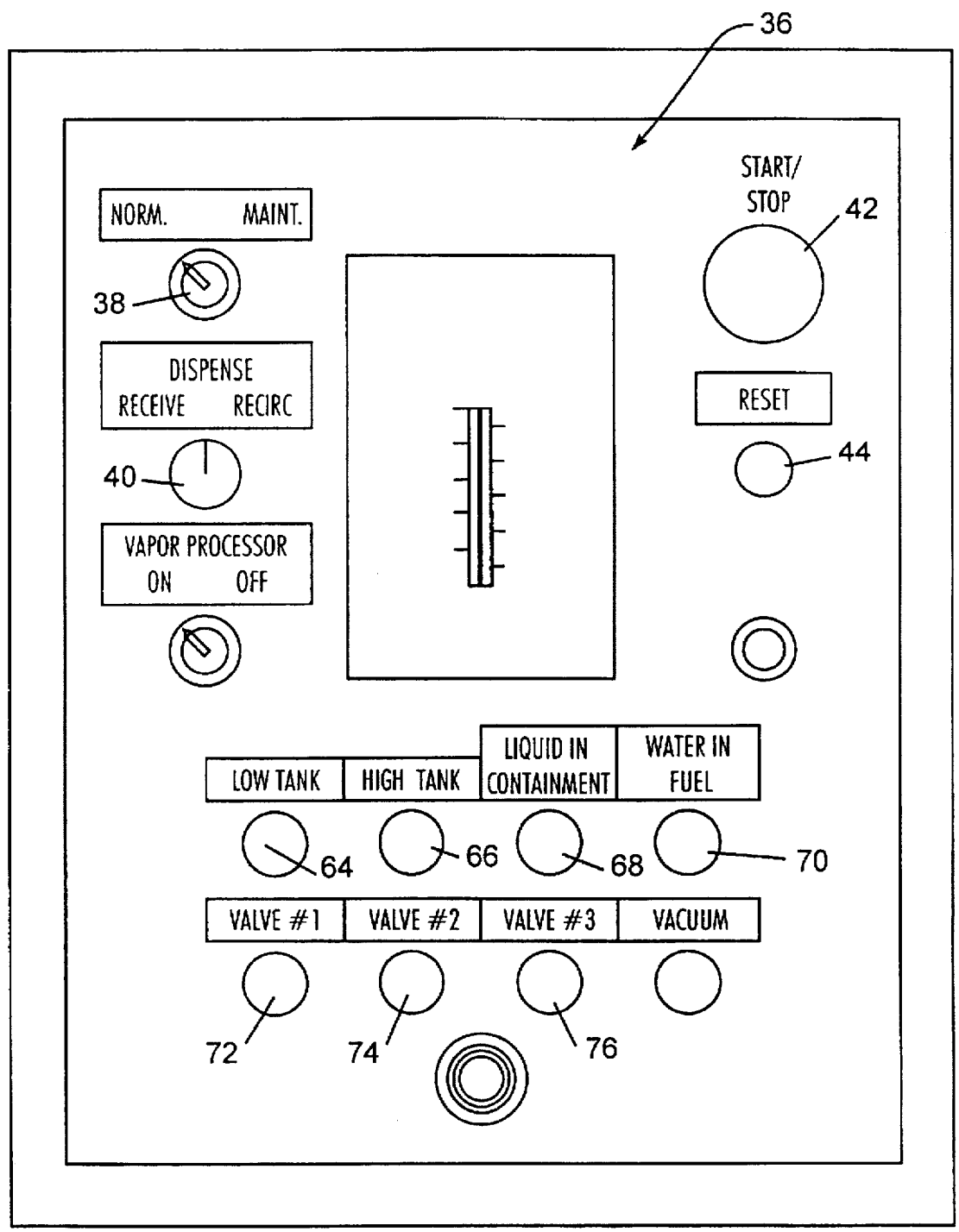
FIG. 5 is a depiction of a preferred control panel of the fuel transfer module of FIG. 1.
Figure 6:
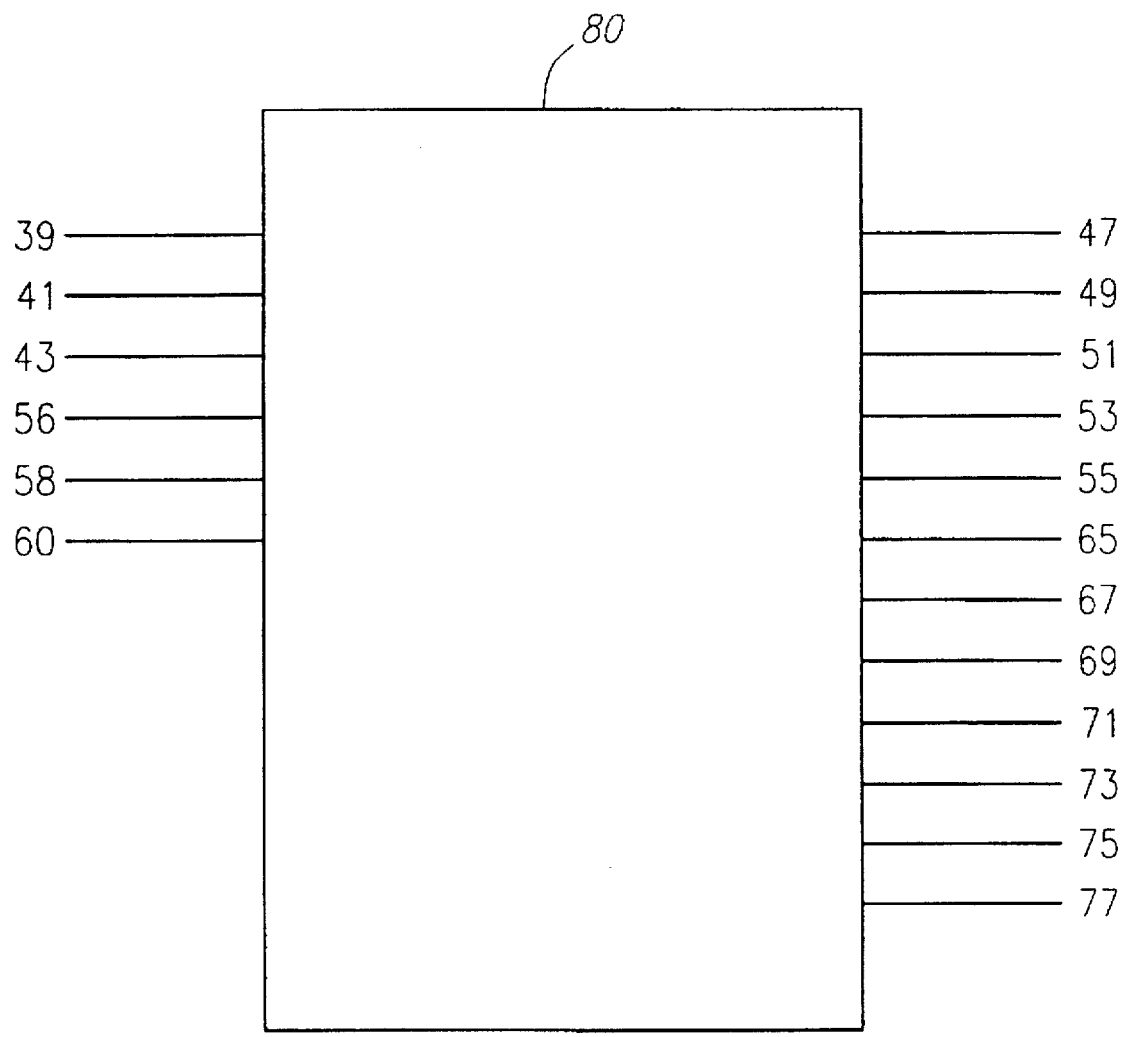
FIG. 6 is a schematic diagram of a preferred electronic circuit card used in the fuel transfer module of FIG.1.
Figure 8:
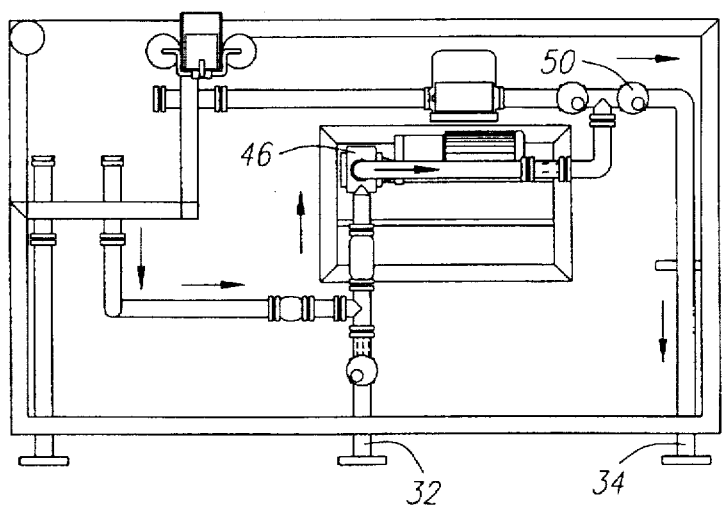
FIG. 8 illustrates the flow path of fuel as it is received in the fuel transfer module of FIG. 1.

As shown in FIG. 1 a plurality of fuel lines 30, 32, and 34 extend through a side wall 16 of the fuel transfer module 10 into the interior of containment 28 and through side walls 16a and 16b in fuel-tight relationships for connections on first ends to an external tank or bladder (not shown) and on second ends to a fuel dispenser 23. Under the control of an operator, fuel flows through these fuel lines 30, 32, and 34 and can be dispensed from, received from, or recirculated to an external tank or bladder (not shown). The user accomplishes these dispense, receive and recirculate functions by operating a control panel, generally designated 36, as shown in detail in FIG. 5. The control panel 36 contains a plurality of controls accessible to the user: a normal/maintenance switch 38, a dispense/receive/recirculate switch 40, a start/stop switch 42, and a reset switch 44. As shown schematically in FIG. 6, these controls are electrically connected to an electronic circuit card 80 that: monitors the state the of these controls (via a normal/maintenance switch signal 39, a dispense/receive/recirculate signal 41, and a start/stop signal 45); and controls the operation of a pump 46, filter 48, a first valve 50, a second valve 52, and a third valve 54 held within the boundaries of the containment 28 (via the following output signals: pump 47, filter 49, first valve 51, second valve 53, and third valve 55). It should be noted that the present fuel transfer pump may be provided either with or without a filter 48. Aviation and other applications sometimes require a filter 48, but some other types of applications do not require a filter 48. An example of a fuel transfer module configuration without a filter 48 is shown in FIG. 8.

For safety and monitoring purposes there are a number of other inputs to and outputs from the electronic circuit card 80. The inputs include: a deadman switch signal 56 that indicates whether a deadman switch (not shown) has been engaged; a fuel level sensor signal / water in fuel signal 58 indicating the level of fuel present in the external tank and the presence of water in fuel; and a liquid in containment signal 60 indicating the presence of fuel in the containment 28. The outputs include: a low tank output signal 64; a high tank output signal 66; a liquid in containment output signal 68; a water in fuel output signal 71; a first valve active output signal 73; a second valve active signal 75; and a third valve active signal 77.

The electronic circuit card 80 is comprised of standard off-the-shelf electronic components. In the best mode, the electronic components will be automotive grade components rated for extremely high and low temperature conditions, such as those a fuel transfer module may be exposed to in hot desert and frozen climates. The design of the electronic circuit card 80 is conventional and would be readily apparent to one skilled in the art based on the following description of functions performed by the electronic circuit card 80.

Figure 7:
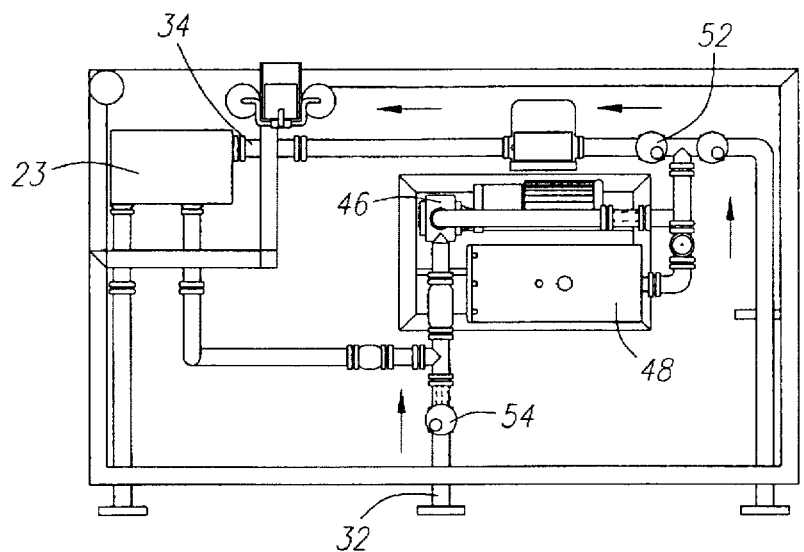
FIG. 7 illustrates the flow path of fuel as it is dispensed from the fuel transfer module of FIG. 1.

To perform either the dispense or receive functions, the deadman switch providing the deadman switch signal 56 must first be engaged. The deadman switch need not be engaged for the recirculate function. For any of the dispense, receive, or recirculate functions the normal/maintenance switch 38 should be in the "normal" position. Placing the dispense/receive/recirculate switch 40 in the dispense position and momentarily depressing the start/stop switch 42 initiates dispensing of fuel. After the start/stop switch 42 is depressed, the electronic circuit card 80 activates the second valve signal 53 and the third valve signal 55, opening the second valve 52 and the third valve 54. Upon the opening of the second valve 52 and third valve 54, the electronic circuit card 80 activates the pump signal 47 and the filter signal 49, causing the pump 46 to pump fuel from the external tank or bladder through fuel line 32 past the third valve 54 to the filter 48 along the path shown in FIG. 7. The fuel continues through the second valve 52 along fuel line 34 to the fuel dispenser 23.

Additionally, when any valve is activated, its corresponding valve active output signal will be activated, illuminating a corresponding valve lamp. Thus, if the first valve 50 is activated, the first valve output signal 73 will be activated, illuminating the first valve lamp 72. Similarly, if the second valve 52 is activated, the second valve output signal 75 will be activated, illuminating the second valve lamp 74. And, if the third valve 54 is activated, the third valve output signal 77 will be activated, illuminating the third valve lamp 76.

Placing the dispense/receive/recirculate switch 40 in the receive position and momentarily depressing the start/stop switch 42 initiates receiving of fuel. After the start/stop switch 42 is depressed, the electronic circuit card 80 activates the first valve signal 51, opening the first valve 50. Upon the opening of the first valve 50, the electronic circuit card 80 activates the pump signal 47 and the filter signal 49, causing the pump 46 to pump fuel from a tank or bladder through fuel line 32 along the path shown in FIG. 8. The fuel continues through the first valve 50 along fuel line 34 to another tank or bladder.

Placing the dispense/receive/recirculate switch 40 in the recirculate position and momentarily depression of the start/stop switch 42 initiates recirculating of fuel. After the start/stop switch 42 is depressed, the electronic circuit card 80 activates the first valve signal 51 and the third valve signal 55, opening the first valve 50 and third valve 54. Upon the opening of the first valve 50 and the third valve 54, the electronic circuit card 80 activates the pump signal 47, and the filter signal 49, causing the pump 46 to pump fuel from the external tank or bladder through fuel line 32 to the third valve 54 and on to the filter 48, along the path shown in FIG. 9. The fuel continues through the first valve 50 through fuel line 34 back to the external tank or bladder.

pressing the start/stop switch 42 stops any of the above mentioned functions while in process. Alternatively, releasing the deadman switch while dispense or receive functions are in process stops the function in process. When any of the functions are stopped, the electronic circuit card will deactivate the signals 51, 53, 55 closing all three valves 50, 52, 54 and the filter signal 49 and pump signal 47 will be deactivated, stopping the filter 48 from filtering and the pump 46 from pumping.

As mentioned above, the electronic circuit card 80 also provides several safety features. In operation, a standard fuel level sensor, such as one made by MAGNETROL of Downers Grove, Ill. is typically placed inside a fuel tank being loaded or unloaded. The fuel level sensor provides the fuel level sensor input signal / water in fuel signal 58 to the electronic circuit card 80. If the fuel level sensor signal 58 goes below a certain predetermined level (typically the 10% level), the electronic circuit card 80 will send out the appropriate signals as described above to stop pumping of fuel to ensure the pump 46 does not run dry, and will activate the low tank output signal 65 illuminating the low tank lamp 64. Similarly, if the fuel level sensor signal 58 goes above a predetermined level (typically the 90% level), the electronic circuit card 80 will send out the appropriate signals as described above to stop pumping of fuel to ensure the external tank or bladder does not overflow, and will activate the high tank output signal 67 illuminating the high tank lamp 66.

Additionally, a conventional fuel level sensor, such as that produced by MAGNETROL also provides an indication of water in fuel signal 58 to the electronic circuit card 80. The MAGNETROL sensor typically outputs a signal in the range of 4–20 mA to indicate the fuel level, and a signal in the range of 40–50 mA to indicate water in fuel. If the water in fuel signal 58 is active, the electronic circuit card 80 will send out the appropriate signals to stop the pump 46 and filter 48, if present, and close the valves 50, 52, 54. Additionally, the water in fuel output signal 71 will be activated, illuminating the water in fuel lamp 70. This safety feature is valuable because the presence of water in fuel can cause engine failure, which is especially dangerous in vehicles such as airplanes.

Finally, to prevent dangerous leaks in the containment 28, a fluid sensor is included in the containment 28. The fluid sensor provides a liquid in containment signal 60 to the electronic circuit card 80. Upon activation of the liquid in containment signal 60, the electronic circuit card 80 will send out the appropriate signals to stop the pump 46 and filter 48 and close the valves 50, 52, 54. Additionally, the liquid in containment output signal 68 will be activated, illuminating the liquid in containment lamp 69. This safety feature is valuable because the presence of liquid in the containment could indicate that a pump or fuel line has malfunctioned, spilling flammable fuel.

Thus, it may be seen from the foregoing description and the accompanying drawings that by this invention there is provided an above ground fuel transfer module that includes a support frame forming a fuel containment vessel for accommodating leakage and the fuel dispensing apparatus is fully protected from damage by being positioned in a recessed compartment within the perimeter of the frame. Further, the fuel transfer module provides control means and safety means to safely and efficiently transfer fuel. While a specific embodiment of this invention has been shown in the drawings and described in connection therewith, it will readily appear to those skilled in the art that various modifications of such embodiment can be made without departing from the invention as defined by the following claims.

I claim:

1. An above ground fuel transfer module, comprising:

a rectangular support frame having an outer perimeter, said frame including vertical side walls around the perimeter and a bottom forming a containment vessel, with portions of said vertical side walls recessed from a maximum horizontal extent of the perimeter of the support frame for forming a recessed compartment outside of said containment vessel opening outwardly toward the perimeter, at least one fuel line connectable to an external fuel tank, said fuel line extending from outside said support frame through said vertical side walls of said support frame, and means for dispensing fuel mounted in said recessed compartment within said frame perimeter and connected to said fuel line within said containment vessel.

2. The fuel transfer module of claim 1, wherein said recessed compartment is formed at a corner of said rectangular support frame, a platform being mounted in said recessed compartment above said bottom of said frame, and a vertical post being mounted at said corner for protecting said recessed compartment.

3. The fuel transfer module of claim 2, wherein said means for dispensing fuel includes a dispensing pump mounted on said platform.

4. The fuel transfer module of claim 1 further comprising:

a pump connected to said fuel line;

at least one valve connected to said fuel line;

a control panel mounted on said fuel transfer module; and an electronic circuit card connected to said control panel, said electronic circuit card having a plurality of input signals for monitoring, and being electrically connected to, said controls, and a plurality of output signals to control operation of and being electrically connected to said pump and said valve.

5. The fuel transfer module of claim 4 further comprising a filter.

6. The fuel transfer module of claim 4 wherein said plurality of controls comprises:

a normal/maintenance switch;

a dispense/receive/recirculate switch; and a start/stop switch.

7. The fuel transfer module of claim 4 wherein said plurality of indicators comprises:

a low tank lamp;

a high tank lamp;

a liquid in containment lamp;

a water in fuel lamp; and at least one valve lamp.

8. The fuel transfer module of claim 4 wherein said plurality of input signals comprise;

a fuel level sensor/water in fuel signal; and a liquid in containment signal.

9. An above ground fuel transfer module, comprising:

a rectangular support frame having an outer perimeter, said frame including vertical side walls around the perimeter and a bottom forming a containment vessel, with portions of said vertical side walls recessed from a maximum horizontal extent of the perimeter of the support frame for forming a recessed compartment outside of said containment vessel opening outwardly toward the perimeter, at least one fuel line connectable to an external fuel tank, said fuel line extending from outside said support frame through said vertical side walls of said support frame, means for dispensing fuel mounted in said recessed compartment within said frame perimeter and connected to said fuel line within said containment vessel, a pump connected to said fuel line, at least one valve connected to said fuel line, a control panel mounted on said fuel transfer module, and an electronic circuit card connected to said control panel, said electronic circuit card having a plurality of input signals for monitoring, and being electrically connected to, said controls, and a plurality of output signals to control operation of and being electrically connected to said pump and said valve.

* * * * *